United States Patent [19]
Brunson

[11] Patent Number: 5,568,033
[45] Date of Patent: Oct. 22, 1996

[54] ON-SITE ELECTRIC MOTOR START-UP DIAGNOSTIC TOOL

[76] Inventor: Walter S. Brunson, 525 Magnolia Dr., Kuttawa, Ky. 42055

[21] Appl. No.: 438,561

[22] Filed: May 10, 1995

Related U.S. Application Data

[63] Continuation-in-part of Ser. No. 242,466, May 13, 1994, Pat. No. 5,416,399.

[51] Int. Cl.$^6$ .............................. H02H 3/04; H02H 7/08
[52] U.S. Cl. .................... 318/778; 318/479; 318/490; 388/903; 361/23; 340/648; 324/772
[58] Field of Search .................. 318/778, 798, 318/806, 430, 453, 454, 459, 471, 478, 479, 490; 388/903, 907.5; 361/23; 340/500, 644, 648; 324/500, 511, 512, 772

[56] References Cited

U.S. PATENT DOCUMENTS

| | | |
|---|---|---|
| 2,241,589 | 5/1941 | Feldhausen . |
| 3,011,162 | 11/1961 | Byrnes . |
| 3,094,646 | 6/1963 | Swett . |
| 3,179,930 | 4/1965 | Pell . |
| 3,531,791 | 9/1970 | Wells . |
| 3,700,964 | 10/1972 | Moore . |
| 3,999,176 | 12/1976 | Kellogg et al. . |
| 4,146,085 | 3/1979 | Wills . |
| 4,167,003 | 9/1979 | Stansbury . |
| 4,176,350 | 11/1979 | Patterson . |
| 4,502,084 | 2/1985 | Hannett . |
| 5,206,572 | 4/1993 | Farag et al. ............................ 318/778 |
| 5,306,995 | 4/1994 | Payne et al. ........................... 318/561 |
| 5,508,875 | 4/1996 | Innes ....................................... 361/93 |
| 5,510,949 | 4/1996 | Innes ....................................... 361/93 |

*Primary Examiner*—Bentsu Ro
*Attorney, Agent, or Firm*—Richard C. Litman

[57] ABSTRACT

A diagnostic tool may be attached to the control panel of a piece of machinery within a plant or factory which includes an electric motor. The diagnostic tool includes indicators for providing information to an operator of the equipment for which the control panel provides power. These indicators inform the operator of various modes of operation of the control circuitry within the control panel which regulate the power going to the motor. In this manner, the operator may determine if the machinery is ready to run, and if not, if it is necessary to call a technician.

8 Claims, 6 Drawing Sheets

ON-SITE ELECTRIC MOTOR START-UP DIAGNOSTIC TOOL

CROSS-REFERENCE TO RELATED APPLICATION

This application is a continuation-in-part of Ser. No. 08/242,466, filed May 13, 1994, now U.S. Pat. No. 5,416,399, issued May 16, 1995.

BACKGROUND OF THE INVENTION

1. Field of the Invention

The present invention relates to diagnostic tools for trouble shooting electric motor start-up control circuitry. More particularly, the present invention relates to such a diagnostic tool which is permanently installed to the motor start-up control panel so as to provide indications of the status of the electric motor and simple instructions for the most general and common troubleshooting techniques to an operator of the device, without the need of a technician.

2. Description of the Prior Art

U.S. Pat. No. 2,241,589 issued May 13, 1941, to Cyril P. Feldhausen discloses a controller for motor driven printing presses which alerts users around the press that a motor is about to start up. The first depression of a start switch disengages that alarm and activates a motor to run the press.

U.S. Pat. No. 3,179,930 issued Apr. 20, 1965, to Eric Pell discloses a circuit condition indicating system having a plurality of fault indicators, each one connected across an overload contact to indicate when that contact opens.

U.S. Pat. No. 3,531,791 issued Sep. 29, 1970, to Richard C. Wells discloses a remote indicating and control device to provide remote controls over a machine and indications of the status of operation of the machine.

U.S. Pat. No. 3,999,176 issued Dec. 21, 1976, to Walter J. Kellog et al discloses indicator light circuitry for indicating normal operation when the light is continuously on, an emergency condition when the light is flashing off and on, another condition when the light is flashing between a dim and bright status, and an off condition.

U.S. Pat. No. 4,167,003 issued Sep. 4, 1979, to Benny W. Stansbury discloses a device for monitoring equipment failures within a plant having sensors at various parts of the plant and digital circuitry for controlling various indicators.

None of the above inventions and patents, taken either singly or in combination, is seen to describe the instant invention as claimed.

SUMMARY OF THE INVENTION

The on-site electric motor diagnostic tool of the present invention allows the operator within a plant or factory to troubleshoot the simplest most common failures associated with starting an electric motor, thereby reducing the number of times a technician has to be called to troubleshoot the problem. In general, factories and plants use three-phase electric motors to power assembly line conveyers, air compressors, and other machinery. Each electric motor generally includes its own control panel having at least a motor start-up relay, overload block protection associated with the motor start-up relay, and a fuse box or circuit breaker circuitry.

Connected to the control panel are a plurality of remote start/stop switches generally located in close proximity to the electric motor and machinery associated therewith. If the operator presses the start button for the machinery and the machinery fails to operate, the operator may go to the control panel and reset the circuit breaker and overload protection block to try and correct the problem. Once doing this and proceeding back to the machinery to try and start it again, if the machinery still fails to start, the operator generally calls a technician to trouble shoot the machinery.

The diagnostic tool of the present invention connects to the control panel of an electric motor so as to give simple indications to the operator when the unit is running, when the unit is ready to run, when one or more of the plurality of remote stop switches may be stuck open, when the overload block as been triggered, and when a fuse is blown or circuit breaker circuit needs to be reset.

Accordingly, it is a principal object of the invention to provide a diagnostic tool attachable to an electric motor start-up control panel for providing indications of the problem of the electric motor start-up control circuitry located therein.

It is another object of the invention to eliminate the necessity of having the operator calling the technician in simple cases where the operator could solve the problem.

It is a further object of the invention to provide the necessary visible indications to the operator of when the machinery will start or is already running.

It is still a further object of the invention to provide improved elements and arrangements thereof in a diagnostic apparatus for the purposes described herein which is inexpensive, simple to connect to existing control panels, dependable, and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
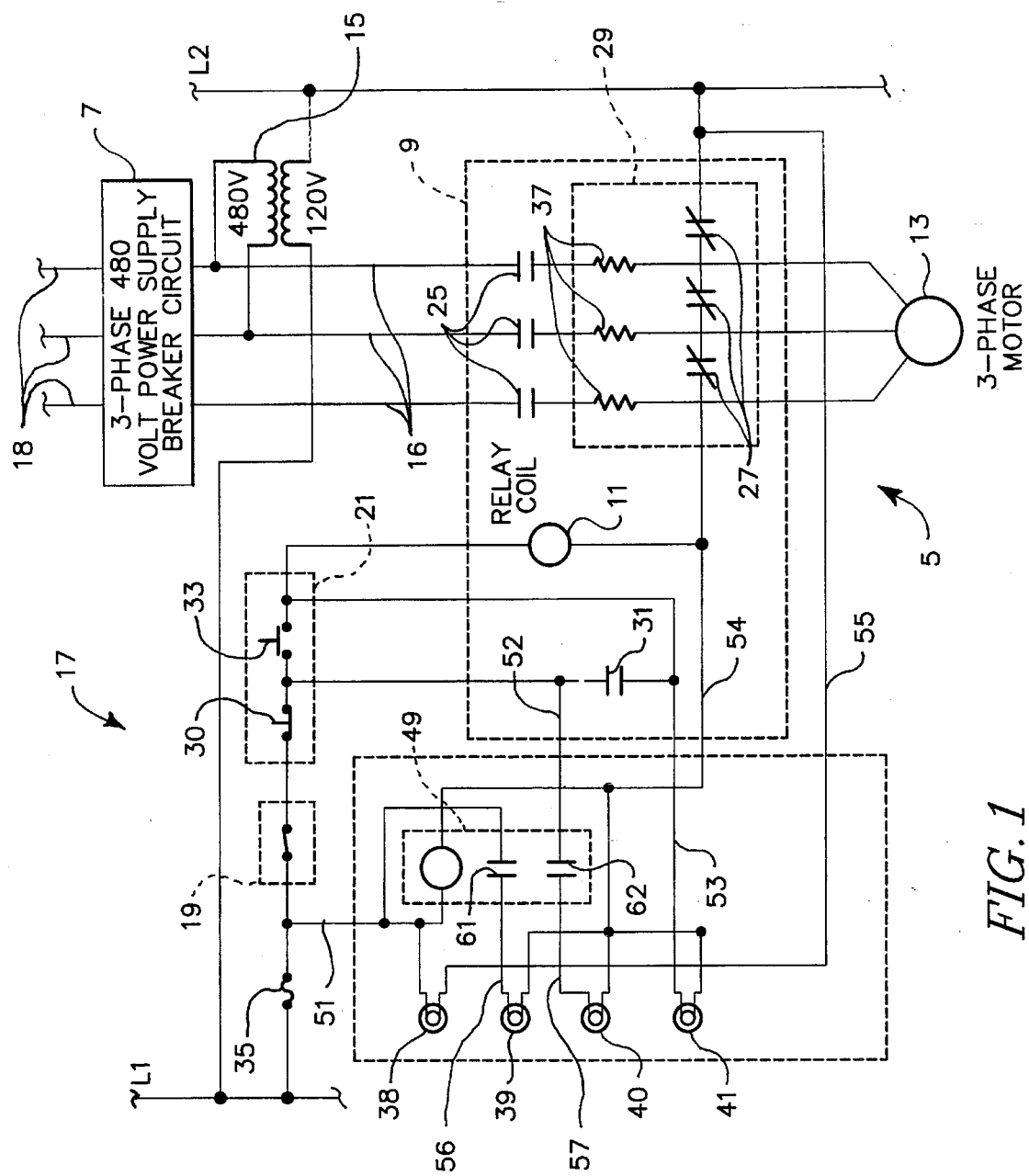
FIG. 1 is an environmental electrical schematic diagram of the present invention.
Figure 3:
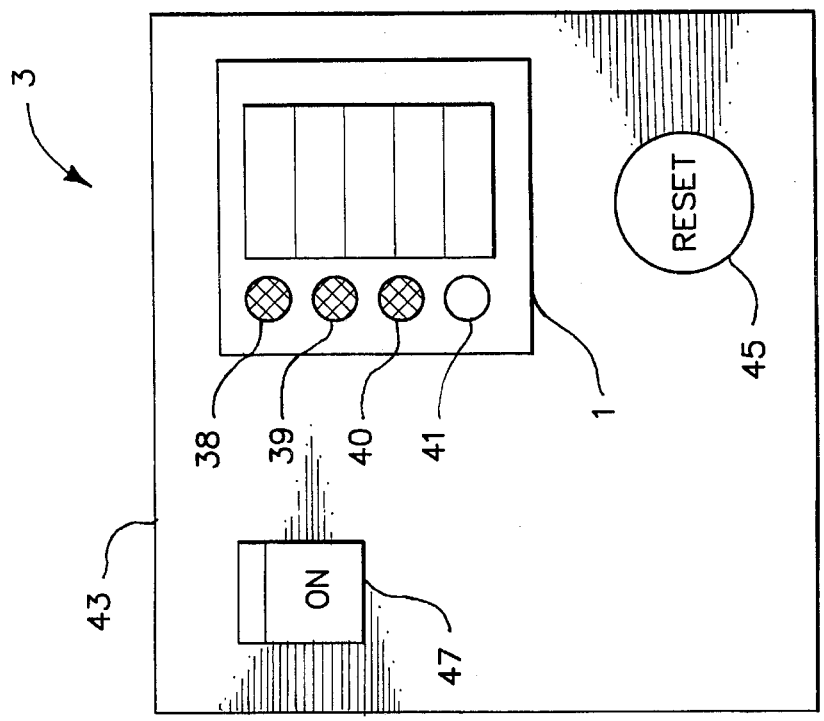
FIG. 3 is an environmental view of the device of the present invention attached to a control panel with the control panel door closed.
Figure 6:
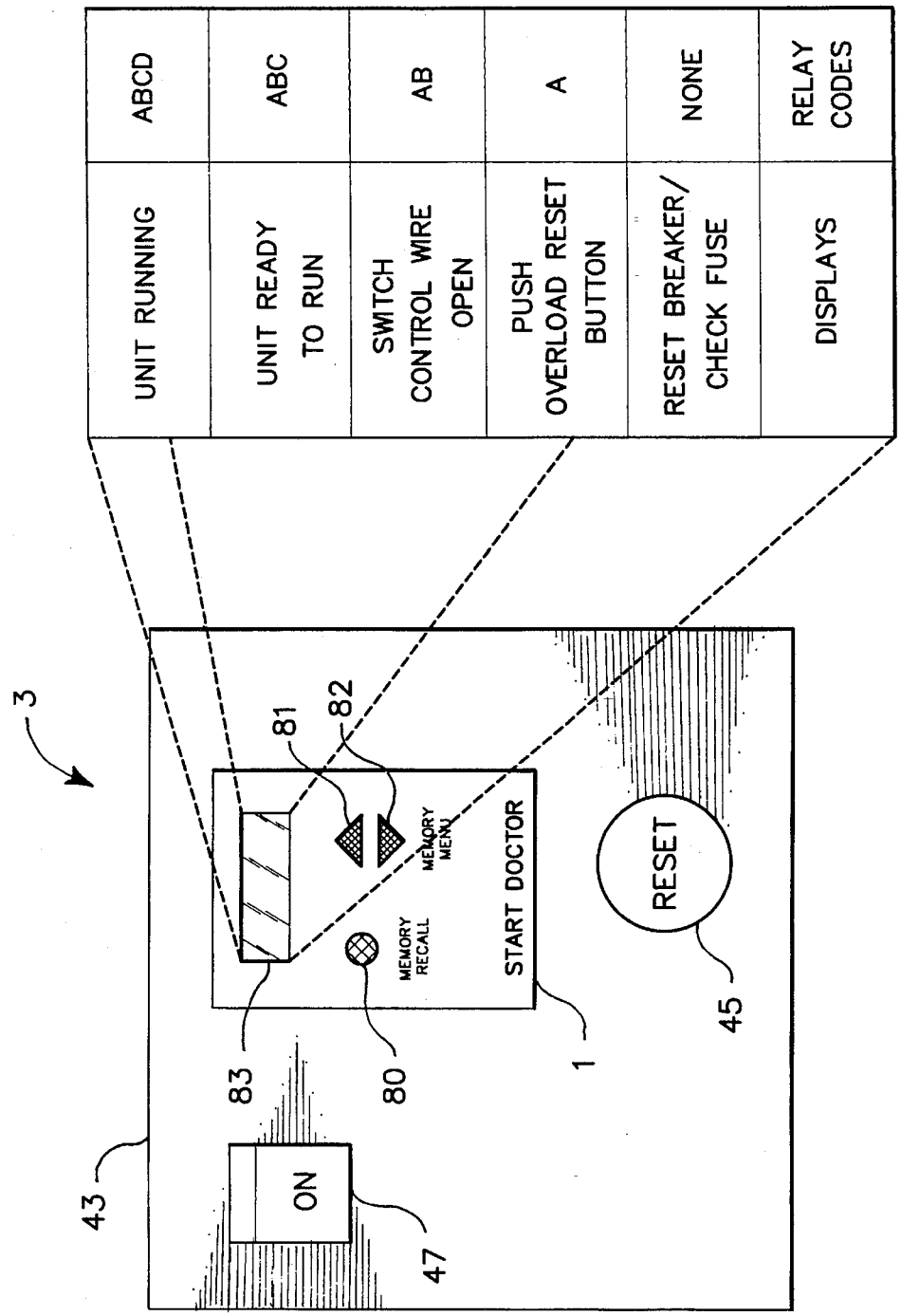
FIG. 6 is an environmental view of the second embodiment of the present invention using a digital display attached to a control panel with the control panel door closed.

The on-site electric motor start-up diagnostic tools 1 or 1' are attached to an electric motor start-up control panel 3, as illustrated in FIGS. 1, 3 and 6. A typical motor start-up control circuit 5 found within an electric motor start-up control panel 3 having diagnostic tool 1 attached thereto is illustrated in FIG. 1. The circuit is typical for most electric motor start-up control panels used in industry. The circuit includes a three-phase 480 volt power supply breaker connected in series with a motor relay 9 and the three-phase electric motor 13. A transformer 15 is used to tap-off some electrical power from one pair of the three-phase power lines 16. This electrical power is used to energize the motor relay coil 11 under the control of a plurality of remote switches 17.

The transformer 15 provides an auxiliary power source of regular household voltage, e.g., 120 volts. This voltage potential is placed across a positive line L1 and a negative line L2. An auxiliary shut down switch 19 and a start/stop controller having a start-up switch 33 and a stop switch 30 are located at a remote location from the motor start-up control panel 3. A motor relay controller conduction path extends across the positive and negative power lines L1 and L2 providing power from the auxiliary power source to the auxiliary shut down switch 19 and the remote start/stop controller 21. The motor relay coil 11 is also provided within the conduction path along with the contacts 27 of an overload protection block 29 incorporated within the motor start-up relay 9.

The start/stop controller 21 is provided to the operator of the machinery utilizing the electric motor 13 allowing the operator to start-up the machinery or shut the machinery down. The auxiliary shut-down switch 19 in series with the remote start/stop controller is generally part of a shut-down sensor incorporated within the machinery to detect a condition which may become dangerous in which the machinery should not be operated. If the shut-down switch 19 is opened, breaking the flow of electrical power within the conduction path, thereby shutting down the electric motor 13 as described below. The particular shut-down sensor utilized in the machinery, both not illustrated, is dependent on the type of machinery used and the particular condition the sensor is monitoring. Neither form a part of the present invention. The diagnostic tools 1 and 1' of the present invention may be utilized by any machinery used in a plant or factory having an electric motor 13 and control panel 3.

As stated above, FIG. 1 illustrates the electric motor start-up circuitry 5 found in a typical control panel 3 used in industry utilizing an auxiliary power source which taps off some of the power provided to the motor 13 to control the starting up and shutting down of the motor 13. If power flows through the conduction path, the relay coil 11 is energized, thereby closing the motor relay contacts 25. With the motor relay contacts 25 closed, the three phase electric power coming from the breaker circuit 7 travels through the motor relay contacts 25 and powers the motor 13. The motor relay coil 11 also causes the seal-in contact 31 to close. The seal-in contact 31 is in parallel with the remote start switch 33 so that the operator may release the start switch 33 after the motor relay coil 11 has been energized, allowing the normally open start switch 33 to open again with the power flowing through the conduction path going through the seal-in contact 31 instead of the start switch 33.

Once the machinery is running as power is being provided to the electric motor 13, the machinery may be shut-down by the breaker circuit 7 in the event of a power surge occurring across the three-phase power lines 18 going into the breaker 7. A fuse 35 is also provided within the conduction path to prevent such a power surge from damaging the motor relay coil 11. If the fuse 35 is blown, the motor relay coil 11 remains de-energized and the motor relay contacts 25 are opened, thereby shutting down the motor 13. In this manner, the electric motor 13 is protected against damage which may occur during a power surge across the power lines 18.

The breaker 7 protects the motor 13 from power surges, but does not protect the motor 13 from a gradual rise in current drain from the power lines 16 which may damage the electric motor 13 by causing it to exceed its recommended maximum output power rating which, over a period of time, would eventually result in the failure of the electric motor 13. To prevent such damage, the starter relay 9 is provided with an overload protection block 29. This includes three resistive heater coils 37, each one located within one line of the three-phase power lines 16, and each one producing a predetermined amount of heat for the normal amount of load current passing across the three power lines 16 when the motor 13 is in operation. The overload block circuit 29 also includes three normally closed overload block contacts 27 located within the conduction path, each overload block contact 27 being associated with one of the overload block resistive heater coils.

Should one or more of the heater coils 37 produce a greater amount of heat than the predetermined amount of heat due to an amount of current passing therethrough being greater than normal, the overload block 29 will not be able to dissipate this additional heat which will eventually build up and cause the each affected, resistive heater coil 37 to heat up to a point such that the overload block contact 27 associated therewith will open. Since each of the overload block contacts 27 are in series with one another within the conduction path, should any one of them open, the conduction path is blocked causing the motor relay coil 11 to de-energize and the motor relay contacts 25 as well as the seal-in contact 31 to open. The motor 13 is shut-down once the motor relay contacts 25 are opened, thereby preventing the motor 13 from being damaged by the excessive prolonged load currents supplied by one or more of the power lines 16.

If the operator is unable to start-up the machinery, the breaker circuit 7 may need to be reset, the overload protection block 29 may need to be reset, the fuse 35 may need to be replaced, the auxiliary shut down switch 19 may have been triggered and the condition which triggered the switch would have to be corrected, or the remote start/stop controller 21 used by the operator may have an open wire or contact. In general, when the operator is unable to restart the machine after resetting the circuit breaker 7 and the overload protection block 29, the operator calls for a technician to troubleshoot the problem. This results in more down time for the machinery and the extra man hours for the technician to troubleshoot the problem.

The diagnostic tools 1 and 1' of the present invention are not intended to eliminate the need for a technician, but are intended to reduce the number of times a technician has to be called by informing the operator of any actions which can be taken by him or her in order to correct the problem. If the operator can solve the problem, the machinery is up and running more quickly than if a technician has to troubleshoot the problem.

Figure 2:
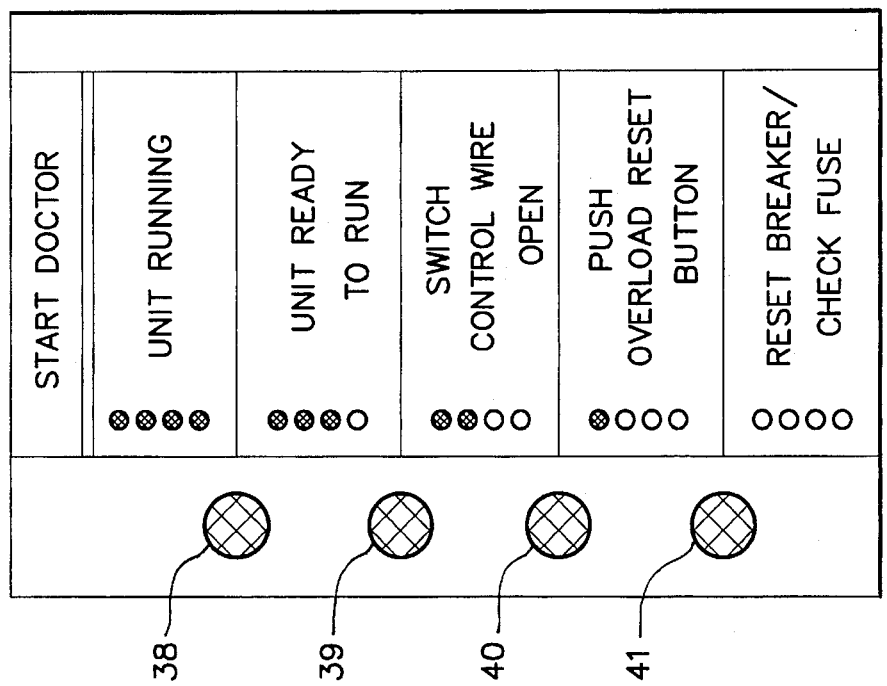
FIG. 2 is a front view of the diagnostic tool of the present invention.
Figure 7:
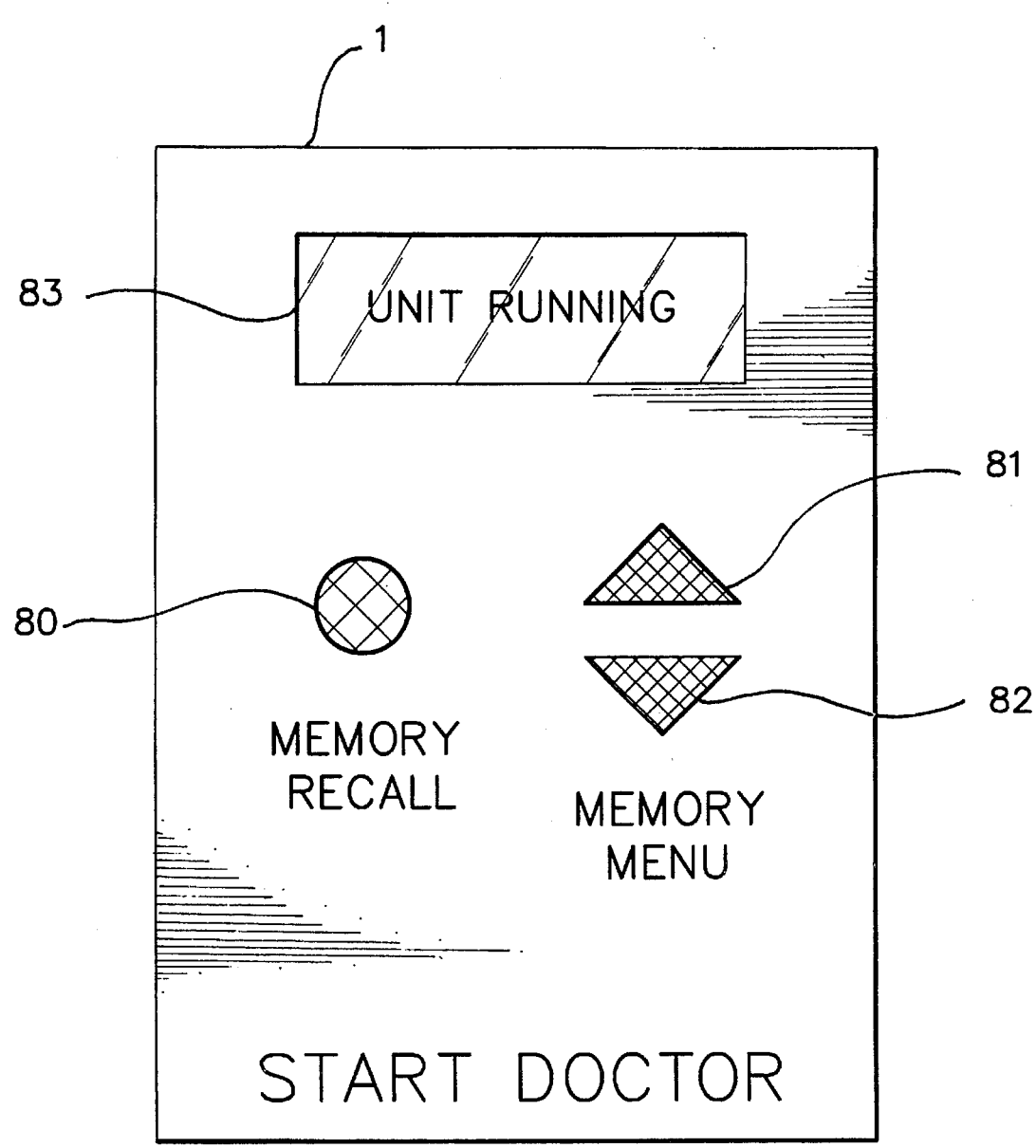
FIG. 7 is a front view of the second embodiment of the diagnostic tool of the present invention using a digital display.

As illustrated in FIG. 2 the diagnostic tool 1 of the present invention is a four light display. An alternate embodiment of the present invention is shown in FIG. 7 as diagnostic tool 1'. Diagnostic tool 1' has a digital display (light emitting diode or liquid crystal). Both diagnostic tools 1 and 1' indicate to a machinery unit operator when the unit is running, when the unit is ready to run, when one or more of the plurality of remote stop switches may be stuck open, when the overload block has been triggered, and when the fuse is blown or circuit breaker needs to be reset. In the example shown in FIG. 2, each of the lamps 38, 39, 40, and 41 are on indicating that the associated machinery is running. Likewise with FIG. 7, if indication relays A, B, C, and D (shown in FIG. 5) are energized the diagnostic tool 1 will display "UNIT RUNNING".

A control panel door 43 having diagnostic tool 1 or 1' of the present invention attached thereto is illustrated in FIG. 3 and FIG. 6 respectively. The control panel 43 already allows the operator to determine whether or not the circuit breaker 7 has been thrown and also allows the operator to reset the overload block through the use of a reset button 45. Generally, a window 47 is provided on the control panel to allow the operator to determine whether or not the breaker 7 needs to be reset. However, if the operator resets the breaker 7 and pushes the overload protection block reset button 45, and then returns to the machinery only to find it still will not start, the operator can not know why the machinery will not run since no indications are provided by the control panel 3 alone of the status of the start-up control circuitry 5 located therein. The diagnostic tools 1 and 1' of the present invention correct for this deficiency.

The diagnostic tool 1 or 1' provides an indication to the operator of the status of the motor start-up control circuitry 5 within the control panel 3. As illustrated in FIG. 3 and FIG. 6, should the operator at the control panel 3 press the overload reset button 45 and the first three lamps 38, 39, and 40 of diagnostic tool 1 or indication relays A, B, and C of diagnostic tool 1' remain on, this indicates to the operator that the machinery will operate once the start button 33 is pressed. As stated above, the remote start/stop controller 21 is located near the machinery, while the control panel 3 is generally located within a motor control center having a plurality of control panels associated therewith, each control panel providing power to a separate piece of machinery, not illustrated. When the operator has to go to the control panel 3 of the machinery which will not start, it would save the operator time to know whether or not after resetting the breaker 7 and overload block circuit 29, whether the machinery will run once the operator returns to the machinery and attempts to start it up.

The other codes provided by the diagnostic tools 1 and 1' to indicate the status of the control circuitry are illustrated in FIG. 2 and FIG. 6 respectively. For example, if only the first lamp 38 or indication relay A is energized, the indication is that at least one of the overload block contacts 27 are open and that the overload protection block 29 needs to be reset. As stated above, the overload contacts 27 are opened when the resistive heater coil 37 associated therewith has reached a temperature greater than a predetermined temperature. Unless the overheated resistive coils 37 are allowed time to cool down, pressing the reset button will not reset the contacts associated therewith. However, the diagnostic tool 1 of the present invention allows the operator to know whether the action taken by him or her has had an effect in correcting the problem before he or she returns to the machinery in an attempt to start it up again.

If all of the lamps 38, 39, 40, and 41 are on, as illustrated in FIG. 2 or if all indication relays A, B, C, and D are energized in FIG. 6, the indication to the operator is that the unit is running. However, if none of the lamps 38, 39, 40, and 41 or indication relays A, B, C, and D are on, the indication to the operator is that the breaker circuit 7 needs to be reset or the fuse 35 needs to be replaced. If the first two lamps 38 and 39 or indication relays A and B are on, either the auxiliary shut-down switch 19 is open or the remote start/stop controller 21 has an open circuit located therein.

Figure 5:
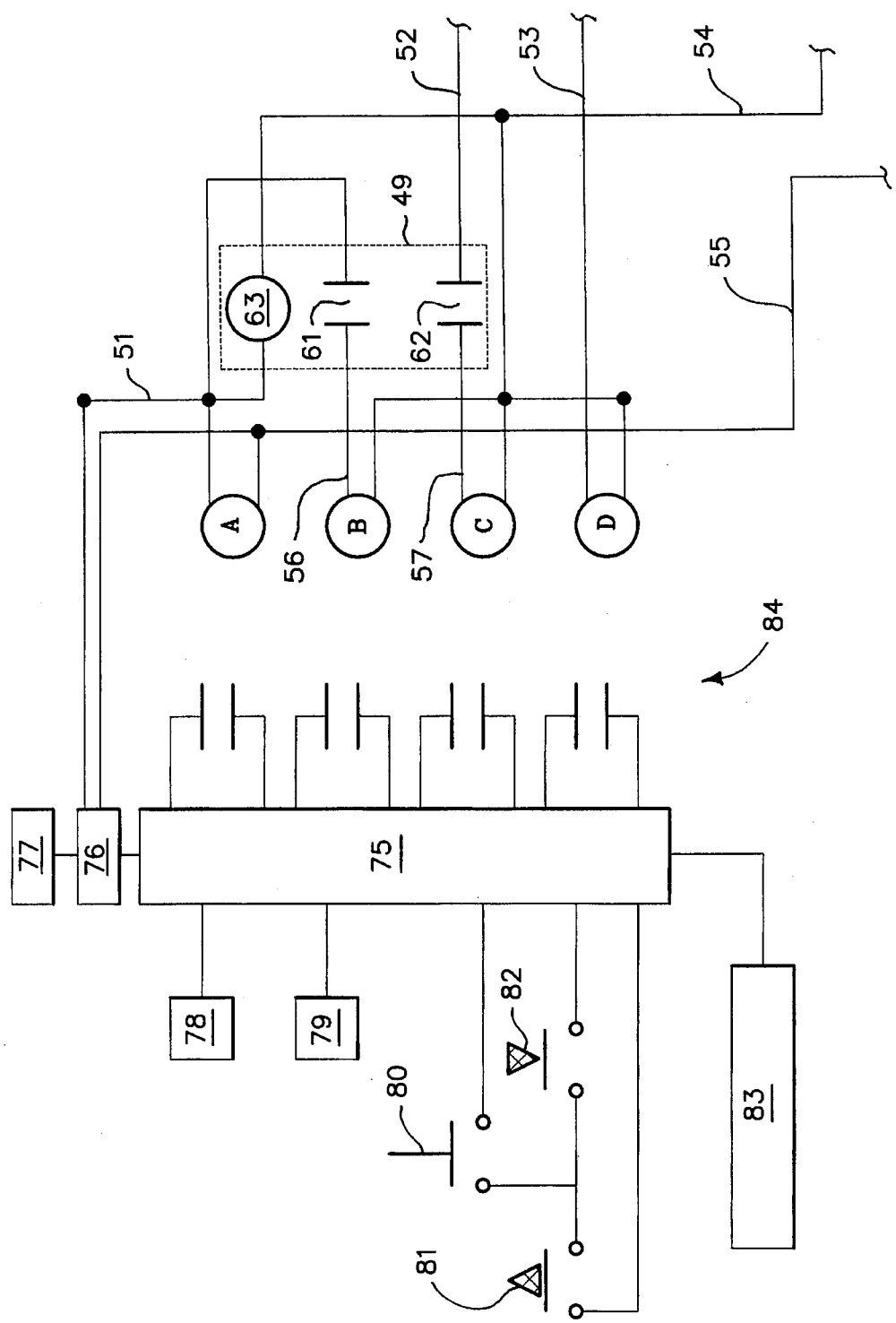
FIG. 5 is an electrical schematic diagram of a second embodiment of the present invention using a digital display.

The on-site diagnostic tool 1 of the present invention is connected to the circuitry 5 of a control panel 3 as illustrated in FIG. 1. As illustrated in FIG. 3, and discussed further below, the housing of the diagnostic tool 1 is attached to the door 43 of the control panel 3 readily visible to the operator. The housing of the diagnostic tool 1 contains the lamps 38, 39, 40, 41, and a backfeed protection relay circuit 49 as illustrated in FIG. 1. The housing of diagnostic tool 1' contains indication relays A, B, C, and D, a backfeed protection relay 63, a microprocessor 75, a power supply 76 with battery backup 77, a reset circuit 78, a clock speed circuit 79, a recall and set switch 80, a pair of memory menu switches, 81 and 82, and a liquid crystal or LED display 83 as illustrated in FIG. 5. The housings of diagnostic tools 1 and 1' include five electrical wire connections extending outward therefrom attached to the electric motor start-up control circuitry 5.

A first wire connection 51 of the diagnostic tool 1 or 1' of the present invention is connected to the electric motor start-up control circuitry between the fuse 35 and the auxiliary shut-down switch 19. A second wire connection 52 is attached between the stop switch 30 and the start switch 33. A third wire connection 53 is attached between the seal-in contact 31 and the motor relay coil 11. A fourth wire connection 54 is attached between the motor relay coil 11 and the overload contacts 27. A fifth wire connection 55 is connected between the overload contacts 27 and the negative line L2. The five wire connections of the device 1 are each connected at various points within the conduction path as described above. In this manner, each of the wire connections 51, 52, 53, 54, and 55 are used by the diagnostic tools 1 and 1' to indicate where power is present or absent within the conduction path as described below.

The first lamp 38 or indication relay A is attached within the housing of the diagnostic tool 1 or 1' respectively at one end to the wire connection 51 and at the other end to the wire connection 55. The second lamp 39 or indication relay B is attached at its two ends to the wire connections 56 and 54. Wire 56 connects to wire 51 through backfeed protection relay contact 61. The third lamp 40 or indication relay C is attached at its two ends to the wire connections 57 and 54. Wire 57 connects to wire 52 through backfeed protection relay contact 62. The fourth lamp 41 or indication relay D is attached at its two ends to the wire connections 53 and 54. The backfeed protection relay 63 is attached to the wire connections 51 and 54.

In this manner, the first lamp 38 or indication relay A indicates that power is available from the fuse 35 within the conduction path if the lamp 38 or indication relay A is on, and the opposite if the lamp 38 or indication relay A is off. The second lamp 39 or indication relay B indicates that power flows from the fuse 35 and through the contacts 27 of the overload protection block 29 when the lamp 39 or indication relay B is on. The third lamp 40 or indication relay C and the fourth lamp 41 or indication relay D indicate when power is available at the respective ends of the seal-in contact 31 when the lamp or indication relay attached to that particular end is on.

If the power is available to the first end of the seal-in contact 31 connected between stop switch 30 and the start switch 33 but is not available at the second end thereof connected between the start switch 33 and the motor relay coil 11, then the electric motor 13 is ready to be run assuming that the overload block contacts 27 are all closed. In this instance, the first three lamps 38, 39, and 40 or indication relays A, B, and C would be on and the lamp 41 or indication relay D would be off since power is not available to the second end of the seal-in contact 31. However, if one of the overload block contacts 27 were open in this instance then the lamps 39, 40, and 41 or indication relays B, C, and D would not be on for the reasons described above. Therefore, the first lamp 38 or indication relay A would be on indicating that, if the overload protection block were reset, the machinery would be ready to run.

If the first lamp 38 or indication relay A is on indicating that power is available from the fuse 35 and the second lamp 39 or indication relay B is on indicating that the overload block contacts 27 are all closed, but the third and fourth lamps 40 and 41 or indication relays C and D are both off, then no power is available to the first or second ends of the seal-in contact 31. In this instance, if the operator were to press the start switch 33, the electric motor 13 will not start. In this instance, since power is available to the fuse 35, but does not reach the first end of the seal-in contact 31 and the start switch 33, then either the auxiliary shut-down switch 19 is open or there is an open circuit between the fuse 35 and the seal-in contact 31.

As stated above, the diagnostic tools 1 and 1' of the present invention include a backfeed protection relay circuit 49. This backfeed protection relay circuit contains two normally open contacts in the positive leads of lamps 39 and 40 or indication relays B and C connected by wires 51, 52, 56, and 57. The coil of the backfeed protection relay is connected to wires 51 and 54, and is parallel with lamp 39 or indication relay B. When there is an overload condition and one or more of the contacts 27 open, the backfeed protection relay is de-energized thus opening backfeed protection relay contacts 61 and 62. This prevents voltage backfeed through the positive ends of lamps 39 and 40 or indication relays B and C. The on-site diagnostic tool 1' contains normally open single contact indication relays A, B, C, and D that are the input to a microprocessor 75. This input information is related to the conditions in the starter circuitry 5 as indicated by the on-site diagnostic tool 1. The microprocessor 75 has a clock and memory to time/date stamp the three said problem conditions, "SWITCH/CONTROL WIRE OPEN", "PUSH OVERLOAD RESET BUTTON", and "RESET BREAKER/CHECK FUSE" as they occur and store them for later recall using the recall and set switch 80 and the pair of memory menu switches 81 and 82. A power supply 76 is required to operate the logic circuit 84 at a lower voltage than the starter circuitry 5 control voltage. A battery backup 77 powers the logic circuit 84 during a "RESET BREAKER/CHECK FUSE" problem condition when no power is available from the starter circuitry 5. A reset circuit 78 is used to provide the microprocessor 75 program with a reset or beginning point if the logic circuit 84 is powered down. A clock speed circuit 79 regulates the speed of the clock in the microprocessor 75. A recall and set switch 80 has multiple input functions such as memory recall, clock set, and power display while under battery backup 77 conditions. A pair of memory menu switches 81 and 82 are used to scroll through the memory to recall past problem conditions and also to set the clock. A liquid crystal or LED display 83 is used to output the conditions in the starter circuitry 5 to the operator as indicated by the microprocessor 75.

Figure 4:
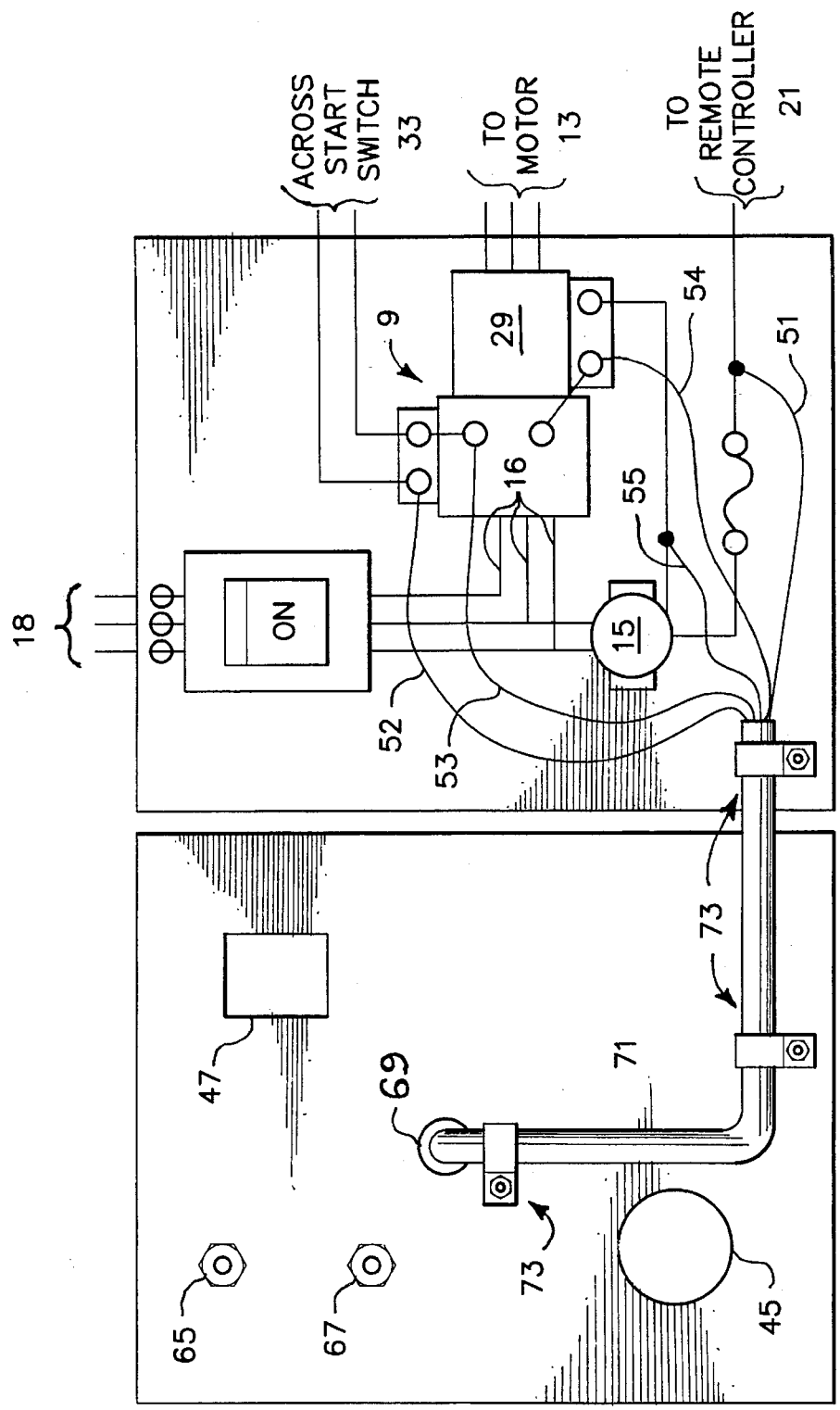
FIG. 4 is an environmental view of the device of the present invention attached to a control panel with the control panel door opened.

The manner in which the diagnostic tool 1 or 1' of the present invention is installed to a control panel so as to be readily visible to an operator will now be described. As illustrated in FIG. 3 and FIG. 6, the diagnostic tools 1 and 1' are attached to the door 43 of a control panel 3. As illustrated in FIG. 4, the back end of an outer housing of the diagnostic tool 1 or 1' includes two threaded screw stems extending out the back thereof having two screws 65 and 67 attached thereto once screw stems are inserted through two holes drilled through the control panel door 43. In this manner the diagnostic tool 1 or 1' is secured to the outside of the control panel door 43. A third hole 69 drilled through the control panel door 43 allowing a cable 71 having each of the wires 51–55 contained therein to enter into the control panel 3. Each of the wires 51 through 55 are connected as indicated in FIG. 4 so that the on-site diagnostic tool 1 or 1' can operate in the manner described above.

It is to be understood that the present invention is not limited to the sole embodiment described above, but encompasses any and all embodiments within the scope of the following claims. Further, other types of indicators may be used instead of the lamps 38, 39, 40, and 41, such as light emitting diodes, preprogrammed digital displays, or audio tone generators having different sounding indications for each condition sensed by the diagnostic tool 1 or 1'.

I claim:

1. An on-site electric motor start-up diagnostic tool attachable to a motor start-up control panel, the panel including at least one normally open drive contact for providing electrical power to an electric motor to drive the motor when the at least one normally open drive contact is closed, a drive relay coil to close the at least one normally open drive contact when energized as power passes from a first end thereof through the drive relay coil to a second end thereof, an auxiliary power supply source for providing a voltage potential across a positive line and a negative line, at least one normally closed stop switch connectable thereto, a load power line for providing power to the at least one normally closed stop switch, a first control wire for receiving power from the at least one normally closed stop switch passing therethrough from the load power line, a second control wire attached to the first end of the drive relay coil, a normally open start switch receiving power from the first control wire and providing that power to the first end of the drive relay coil when closed, a normally open seal-in contact closed when the drive relay coil is energized, the normally open seal-in contact receiving power from the first control wire and providing that power to the first end of the drive relay coil when closed, at least one normally closed overload block contact connected to the second end of the drive relay coil and to the negative line for grounding the second end of the drive relay coil when closed, and an overload circuit including means for detecting an overload condition of the electric motor and means for opening the at least one overload block contact when an overload condition of the electric motor is detected thereby, said on-site electric motor start-up diagnostic tool comprising:

a first indicator for indicating the presence of a voltage potential between the load power line and the negative line;

a second indicator for indicating the presence of a voltage potential between the load power line and the second end of the drive relay coil;

a third indicator for indicating the presence of a voltage potential between the first control wire and the second end of the drive relay coil; and a fourth indicator for indicating the presence of a voltage potential between the second control wire and the second end of the drive relay coil.

2. An on-site electric motor start-up diagnostic tool as claimed in claim 1, further comprising:

a first backfeed protection relay contact having a first connection to said second indicator and a second connection to the load power line;

a second backfeed protection relay contact having a first connection to said third indicator and a second connection to the first control wire;

a backfeed protection relay coil having a first connection to the load power line and a second connection to the second end of the drive relay coil, said backfeed protection relay coil closing said first backfeed protection relay contact and said second backfeed protection relay contact when electric current passes through said backfeed protection relay coil, whereby said first backfeed protection relay contact and said second backfeed protection relay contact are open when the at least one overload block contact is open since no electric current flows from the load power line through said backfeed protection relay coil to the second end of the drive relay coil when the at least one overload block contact is open, thus preventing voltage backfeed through said second indicator and said third indicator.

3. An on-site electric motor start-up diagnostic tool as claimed in claim 1, wherein said first, second, third, and fourth indicators include lamps contained within an outer housing connectable to an outside portion of the motor start-up control panel.

4. An on-site electric motor start-up diagnostic tool as claimed in claim 1, wherein said first, second, third, and fourth indicators include normally open single contact indication relays connected to a logic circuit with a memory, a clock, and a digital display and are contained within an outer housing connectable to an outside portion of the motor start-up control panel.

5. A motor start-up control panel comprising:

at least one normally open drive contact for providing electrical power to an electric motor to drive the motor when said at least one normally open drive contact is closed;

a drive relay coil to close said at least one normally open drive contact when energized as power passes from a first end thereof through said drive relay coil to a second end thereof;

an auxiliary power supply source for providing a voltage potential across a positive line and a negative line;

at least one normally closed stop switch connectable thereto;

a load power line providing power to said at least one normally closed stop switch;

a first control wire for receiving power from said at least one normally closed stop switch passing therethrough from said load power line;

a second control wire attached to the first end of said drive relay coil;

a normally open start switch receiving power from said first control wire and providing that power to the first end of said drive relay coil when closed;

a normally open seal-in contact closed when the drive relay coil is energized, the normally open seal-in contact receiving power from said first control wire and providing that power to the first end of said drive relay coil when closed;

at least one normally closed overload block contact connected to the second end of said drive relay coil and to the negative line for grounding the second end of said drive relay coil when closed;

an overload circuit including means for detecting an overload condition of the electric motor and means for opening said at least one overload block contact when an overload condition of the electric motor is detected thereby;

a first indicator for indicating the presence of a voltage potential between said load power line and the negative line;

a second indicator for indicating the presence of a voltage potential between said load power line and the second end of said drive relay coil;

a third indicator for indicating the presence of a voltage potential between said first control wire and the second end of said drive relay coil; and a fourth indicator for indicating the presence of a voltage potential between said second control wire and the second end of said drive relay coil.

6. An motor start-up control panel as claimed in claim 5, further comprising:

a first backfeed protection relay contact having a first connection to said second indicator and a second connection to said load power line;

a second backfeed protection relay contact having a first connection to said third indicator and a second connection to said first control wire;

a backfeed protection relay coil having a first connection to said load power line and a second connection to the second end of said drive relay coil, said backfeed protection relay coil closing said first backfeed protection relay contact and said second backfeed protection relay contact when electric current passes through said backfeed protection relay coil, whereby said first backfeed protection relay contact and said second backfeed protection relay contact are open when said at least one overload block contact is open since no electric current flows from said load power line through said backfeed protection relay coil to the second end of said drive relay coil when said at least one overload block contact is open, thus preventing voltage backfeed through said second indicator and said third indicator.

7. A motor start-up control panel as claimed in claim 5, wherein said first, second, third, and fourth indicators include lamps contained within an outer housing connectable to an outside portion of said motor start-up control panel.

8. A motor start-up control panel as claimed in claim 5, wherein said first, second, third, and fourth indicators include normally open single contact indication relays connected to a logic circuit with a memory, a clock, and a digital display and are contained within an outer housing connectable to an outside portion of said motor start-up control panel.

* * * * *